United States Patent [19]

Wallace

[11] 4,071,265
[45] Jan. 31, 1978

[54] THREADED MECHANICAL JOINT WALL SLEEVE

[76] Inventor: Thomas J. Wallace, 4909 N. 104th St., Omaha, Nebr. 68134

[21] Appl. No.: 616,435

[22] Filed: Sept. 24, 1975

[51] Int. Cl.² ............................................. F16L 5/02
[52] U.S. Cl. .................................... 285/158; 52/220; 285/356
[58] Field of Search ................. 285/158, 64, 192, 372, 285/31, 32, 337, 356; 52/220; 248/56; 403/200, 192, 197

[56] References Cited

U.S. PATENT DOCUMENTS

| | | | |
|---|---|---|---|
| 502,665 | 8/1893 | Friede | 285/12 X |
| 1,030,237 | 6/1912 | Hall | 285/158 X |
| 1,079,350 | 11/1913 | Kelly | 285/356 X |
| 1,391,396 | 9/1921 | McMurtrie | 285/158 |
| 1,908,796 | 5/1933 | Suchan | 285/158 X |
| 2,272,222 | 2/1942 | Mullen | 285/356 X |
| 2,733,939 | 2/1956 | Scherer | 285/372 X |
| 3,125,358 | 3/1964 | Kleinberg et al. | 285/192 X |
| 3,348,850 | 10/1967 | Scales | 285/192 X |
| 3,351,361 | 11/1967 | Martin | 285/158 X |
| 3,848,897 | 11/1974 | McClellan | 248/56 X |
| 3,914,843 | 10/1975 | Antonacci | 285/158 X |

FOREIGN PATENT DOCUMENTS

| | | | |
|---|---|---|---|
| 579,721 | 7/1959 | Canada | 285/158 |
| 720,741 | 12/1931 | France | 285/158 |

*Primary Examiner*—Thomas F. Callaghan
*Attorney, Agent, or Firm*—Zarley, McKee, Thomte & Voorhees

[57] ABSTRACT

A threaded mechanical joint wall sleeve comprising a cylindrical member having opposite ends with inside and outside surfaces. The cylindrical member is adapted to be centrally positioned relative to a wall member and has an annular collar extending outwardly therefrom which is imbedded in the wall member. A pair of flanged end members or adapters are threadably secured to the outside or inside surfaces of the opposite ends of the cylindrical member and are adapted for attachment to the opposite sides of the wall member. A wide variety of wall thicknesses and pipe diameters may be accommodated due to the fact that the length of the cylindrical member may be varied and due to the fact that the adapters may be either threadably secured to the external threads or the internal threads provided on the opposite ends of the cylindrical member.

3 Claims, 3 Drawing Figures

THREADED MECHANICAL JOINT WALL SLEEVE

BACKGROUND OF THE INVENTION

This invention relates to a mechanical joint wall sleeve and more particularly to a threaded mechanical joint wall sleeve.

Mechanical joint wall sleeves are commonly used to provide a means for extending a pipe or the like through a wall. Mechanical joint wall sleeves may also be used to provide the connection between a pair of pipes which extend into opposite sides of the wall.

Mechanical joint wall sleeves are ordinarily cast to particular specifications depending upon the wall thickness and the diameter of the pipe to be accommodated. Thus, it is necessary for a huge inventory to be maintained by the contractor since a large number of combinations are possible due to varying wall thicknesses and pipe diameters.

Therefore, it is a principal object of the invention to provide a mechanical joint wall sleeve which may accommodate various wall thicknesses.

A further object of the invention is to provide a threaded mechanical joint wall sleeve which greatly reduces the inventory normally required.

A further object of the invention is to provide a threaded mechanical joint wall sleeve wherein end members or adapters may be threadably secured to either the inside or outside surfaces of a cylindrical member which is embedded in the wall member.

A still further object of the invention is to provide a threaded mechanical joint wall sleeve which is durable in use.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

DESCRIPTION OF THE PREFERRED EMBODIMENT

Figure 1:
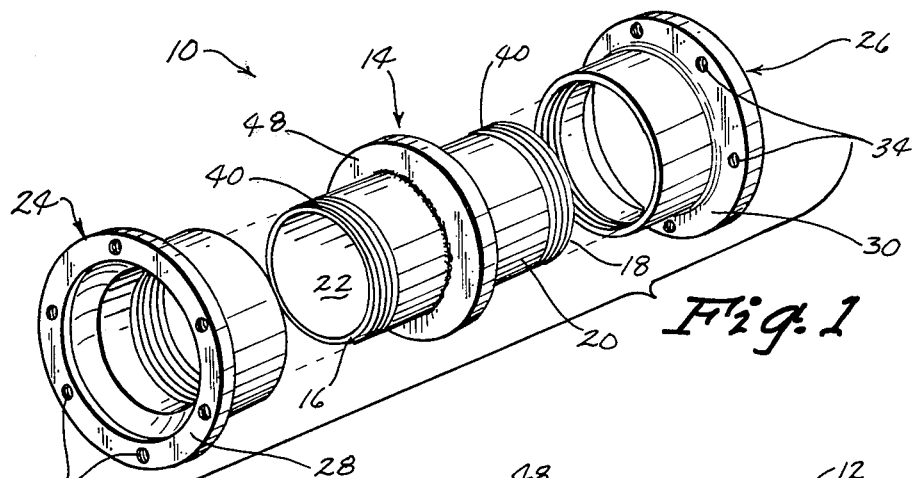
FIG. 1 is an exploded perspective view of the mechanical joint wall sleeve of this invention.

The numeral 10 generally refers to the threaded mechanical joint wall sleeve of this invention while the numeral 12 refers to a concrete wall or the like in which the sleeve will be mounted. Sleeve 10 generally comprises a cylindrical member 14 having opposite ends 16 and 18. For purposes of description, cylindrical member 14 will be described as having an outside surface 20 and an inside surface 22.

Figure 2:
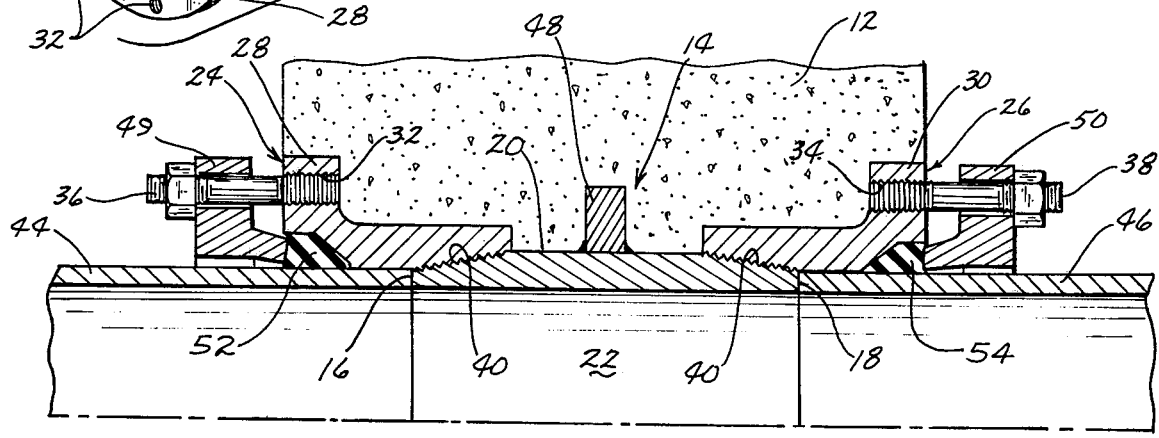
FIG. 2 is a partial longitudinal sectional view illustrating the sleeve positioned in a concrete wall.
Figure 3:
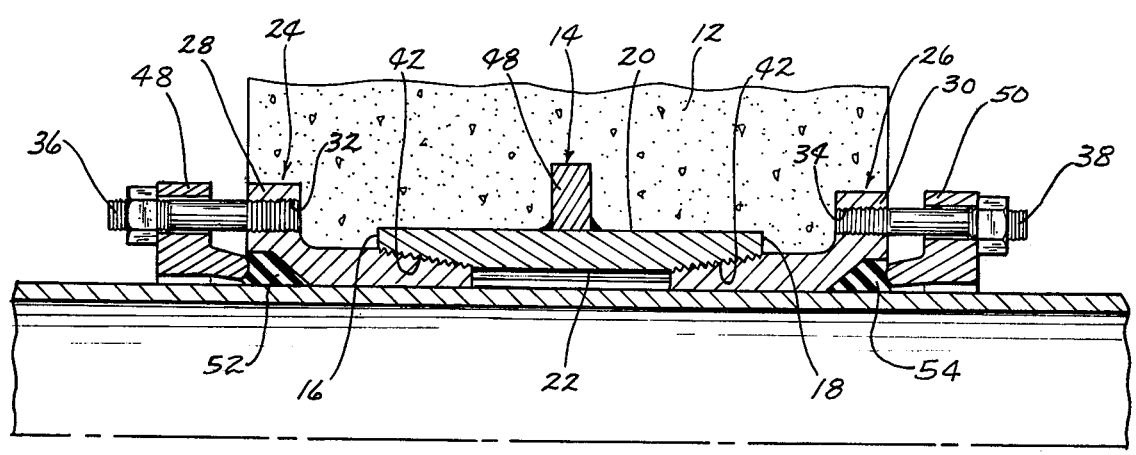
FIG. 3 is a sectional view similar to FIG. 2 except that the end members are received by the internal threads of the cylindrical member.

Sleeve 10 also comprises a pair of end members or adapters 24 and 26 which are adapted to be threadably secured to the opposite ends of the member 14 in the manner illustrated in FIGS. 2 and 3. The end members 24 and 26 are normally provided with flange portions 28 and 30 respectively to facilitate the attachment of the end portions to the wall 12. The flanges 28 and 30 are provided with a plurality of spaced apart threaded openings 32 and 34 formed therein respectively which are adapted to receive bolts 36 and 38 as illustrated in FIG. 3.

The normal method of installing the sleeve 10 is as follows. The ultimate thickness of wall 12 would be determined and the proper cylindrical member 14 would be selected depending upon the thickness of the wall. The cylindrical member 14 could have been previously cast or could be cut to the proper length as required. The cylindrical member 14 may be provided with either external threads 40 at its opposite ends or internal threads 42 as shown in FIGS. 2 and 3 respectively. The fact that the threads on cylindrical member 14 may be either internal or external as stated substantially reduces the required inventory of the cylindrical members. For example, if the adapters or end members 24 and 26 are going to accommodate a smaller diameter pipe, the cylindrical member 14 would be provided with internal threads and the adapters 24 and 26 provided with external threads to permit the threadable connection illustrated in FIG. 3. Conversely, if the cylindrical member 14 seen in FIG. 3 is to be used with larger adapters 24 and 26 such as in FIG. 2, external threads would be provided on the cylindrical member 14 and internal threads provided on the inner ends of the adapters 24 and 26.

After the size of the cylindrical member 14 and the adapters 24 and 26 has been determined, the adapters would be threadably secured to the cylindrical member 14 and positioned in conventional fashion. The wall 12 would then be poured or formed so that the members 14, 24 and 26 would be embedded in the wall 12 as illustrated in FIG. 2. If desired, a collar 48 may be provided on the external surface of the member 14 to aid in preventing moisture leakage around the sleeve. After the wall 12 has been formed, the pipes 44 and 46 may be installed as desired. Seals 52 and 54 sealably embrace the pipes 44 and 46 as seen in FIGS. 2 and 3 and are held in sealing engagement therewith by the ring-shaped retainers 49 and 50 respectively.

Thus as can be seen that a unique threaded mechanical joint wall sleeve has been provided which substantially reduces the normally required inventory. The ability of the adapters to be either externally or internally threaded onto the ends of the cylindrical member 14 allows such a substantial reduction in inventory. Thus it can be seen that the invention accomplishes at least all of its stated objectives.

I claim:

1. A threaded mechanical joint wall sleeve for use in a concrete wall member, comprising, a cylindrical member having opposite ends and inside and outside surfaces, said cylindrical member being adapted to be substantially centrally positioned in said wall member, a pair of end members threadably secured to the opposite ends of said cylindrical member and extending outwardly therefrom, said end members having flange portions at their outer end portions which are substantially flush with said wall member, said cylindrical member having a length substantially less than the thickness of said wall member, each of said end members adapted to receive a sealing O-ring therein which is adapted to sealably embrace a pipe member extending therethrough, a retainer operatively secured to each of said flanges for maintaining said O-rings in said sealing relationship.

2. The sleeve of claim 1 wherein said cylindrical member has external threads at its opposite ends and wherein said end members have inner ends which threadably embrace the ends of said cylindrical member.

3. The sleeve of claim 1 wherein said cylindrical member has internal threads at its opposite ends and wherein said end members have inner ends which are threadably embraced by the ends of said cylindrical member.

* * * * *